United States Patent [19]

Bickford

[11] Patent Number: 5,531,553

[45] Date of Patent: Jul. 2, 1996

[54] MASONRY FIXING

[76] Inventor: Charles Bickford, 10 Aldermans Hill, Hockley, SS5 4RW, United Kingdom

[21] Appl. No.: 184,550

[22] Filed: Jan. 19, 1994

Related U.S. Application Data

[63] Continuation-in-part of Ser. No. 6,714, Jan. 20, 1993, Pat. No. 5,320,216.

[51] Int. Cl.⁶ .............................. F16B 35/00; F16B 35/04
[52] U.S. Cl. ............................ 411/389; 411/411; 411/414
[58] Field of Search ................................... 411/389, 411, 411/412, 414, 424; 405/259.5, 259.6

[56] References Cited

U.S. PATENT DOCUMENTS

| | | | |
|---|---|---|---|
| 2,005,672 | 6/1935 | Chaffee | 411/414 |
| 2,380,724 | 7/1945 | Crooks | 411/414 |
| 4,350,464 | 9/1982 | Brothers | 411/389 X |
| 4,536,117 | 8/1985 | Yamashiro | 411/411 |
| 4,544,313 | 10/1985 | Grossberndt | 411/411 |
| 4,652,194 | 3/1987 | Tajima et al. | 411/414 X |
| 4,764,067 | 8/1988 | Kawashima | 411/412 X |

FOREIGN PATENT DOCUMENTS

| | | | |
|---|---|---|---|
| 54903 | 9/1889 | Germany | 411/411 |
| 3400182 | 7/1985 | Germany | 405/259.5 |

*Primary Examiner*—Neill R. Wilson
*Attorney, Agent, or Firm*—Gregory M. Howison

[57] ABSTRACT

A masonry fixing device 1 comprises a steel shank 2 which in the form of the blank is right circular cylindrical form. A ridge-groove-ridge configuration extends helically along the lower portion 4 of shank 2 and comprises a pair of parallel opposed ridges 7 upstanding from an adjacent land 9. Each ridge defines with the adjacent ridge a groove 5. At least the forward end of the lower portion 4 of shank 2 is configured so as to provide a self-tapping facility. In use, the fixing device is introduced into a pre-drilled bore in a masonry substrate such as brickwork by turning so as to form a thread on the interior walls of the bore. The axial dimension of the land 9 is at least 50% of the blank diameter with the result that relatively large amounts of substrate material are disposed between the ridge-groove-ridge configuration when the fixing device is in place. The resulting pull out strengths of the fixing device in masonry structures is superior to the majority of fixing devices available for masonry use and the device is less costly in materials terms and easier to use than typical expansion bolts.

12 Claims, 8 Drawing Sheets

MASONRY FIXING

CROSS REFERENCE TO RELATED APPLICATION

This application is a continuation-in-part of U.S. patent application Ser. No. 08/006,714, filed Jan. 20, 1993, now U.S. Pat. No. 5,320,216, and entitled "Improved Masonry Fixing".

TECHNICAL FIELD OF THE INVENTION

The invention relates to methods of fixing applied particularly, but not exclusively, to masonry or timber substrates, and to masonry or timber fixing devices for use therein.

BACKGROUND OF THE INVENTION

Conventional threaded fixing devices such as screws are difficult to secure in masonry substrates since it is difficult for a conventional thread to find secure location within a bore in such a substrate. Conventional screw threaded fixings are accordingly conventionally secured within bores in masonry substrates by first lining the bore with a lining of relatively soft material into which the threaded fixing can cut its own thread, at the same time compressing the lining against the walls of the bore within the masonry substrate. A typical example of such a lining is that sold under the trade mark Rawlplug. Such linings are available in fibrous and plastics material form and in a wide variety of configurations reflecting a very considerable activity in the art over the years to improve upon the security and ease of use of screw threaded fixing devices used with such liners.

Adopting a somewhat similar principle, alternative forms of fixing device are of metallic material and structured so as to be expansible after introduction into a bore in a masonry material whereby compressive forces against or impingement into the internal surfaces of the bore resist withdrawal of the fixing device from the bore. Reflecting similarly substantial activity in the art, a wide variety of such devices are available. For example, various devices of this kind are available under the above-mentioned trade mark Rawlplug and under the trade mark Fischer.

The Upat TOP self undercutting anchor comprises an internally threaded cylindrical tubular steel sleeve and a cone received in one open end of the sleeve. A splined lower part of the cylindrical sleeve is in contact with the inclined walls of the cone, these wall being divergent in the direction away from the sleeve. The above described assembly is inserted into a pre-drilled bore until the extremity of the cone (i.e. the base of the conical portion) comes into contact with the end of the bore. Application of light pressure from a hammer drill causes the splined section to be forced over the conical surface, the splines having tungsten carbide tips which undercut the substrate material. The Upat EXA Express Anchor also operates an expansion fixing but does not operate on the undercutting principle.

Fixing devices somewhat similar to those sold under the trade mark Rawlplug are also sold under the trade mark Fischer, as mentioned earlier. Fixing devices are also made by Fischer which are somewhat similar in structure and operation to the above-described Upat fixing elements. The Fischer Wallbolt comprises a segmented malleable iron expander shield forming a sleeve about an orthodox screw threaded bolt. The combined assembly is in use inserted into a pre-drilled bore in a masonry substrate and the bolt is tightened with a spanner. This draws a terminal conical wedge backwards into the shield and forces four shield segments outwardly against the sides of the bore.

All fixing elements which rely on compression of an associated member into the wall of a pre-drilled bore give rise to structural disadvantages. The wall of the bore are placed under stress and in many substrate materials there is insufficient strength in the substrate structure to prevent cracking. This is particularly the case with such materials as lightweight autoclaved aerated concrete but also applies to brick structures. It is especially evident adjacent apertures in a masonry structure where on one side at least there will be comparatively small thickness of substrate material. Of course, fixing elements are commonly required in aperture regions for the fixing of window frames, door liners and similar fittings.

Equally, a good deal of activity has been focused on improvement of screw threaded members themselves in order that they should find secure fixing in masonry materials without the use of liners and without internal expansion. The driving force in these respects is, of course, the fact that liners do not provide totally satisfactory degrees of security, the fact that the need to insert a liner in a bore represents an additional activity which has associated labour costs and the fact that in the case of expansion bolts and such like the compressive forces necessary for security of fixing can result, as noted above, in rupture of masonry materials particularly when adjacent to extremities of bodies of such materials.

UK Patent Specifications Nos 2 115 511 (ITW III) and 2 152 171 (ITW II) disclose masonry fixing comprising a shank having spaced threads in the form of a helical ridge alternating with a parallel land. The flanks of the threads intersect at an angle of 50° to 65° and exhibit a helix angle of 6° to 8.5°. These features are necessarily combined with special conditions for introduction into a masonry bore and are claimed to provide security of fixing without thread striping upon insertion. Both ITW II and III represent examples of effort in the art to provide threaded devices for direct securement in a bore so as to avoid the disadvantages of expansion-type devices enumerated above.

Coarse deep threads are also disclosed in a fixing for use in masonry-like structures in UP Patent Specification No 1 510 686 (ITW IV), a further example of an attempt to provide a direct-fixture fixing agent. In this particular arrangement, the crests of the deep threads are notched in order to assist in the cutting of a thread by the fixture in use and to assist in the transmission or masonry debris within the bore. An intermediate shallower thread ridge appears to be the key to providing a design which enables security of fixture to be achieved whilst at the same time recognizing the need to minimize disturbment of the substrate material. Nevertheless, threads penetrate the substrate at fairly closely spaced positions such that pull-out performance is impaired by the shear resistance of the relatively small sections of substrate material between helical ridge turns. A similar arrangement is disclosed in European Patent Application No 0 133 773 (ITW I).

UK Patent Specification No 466039 (Jasper) discloses a fastening screw having a shank provided with a helical thread groove alternating with a land between the grooves. A longitudinal slop provides self-tapping capacity for the course deep thread. Jasper does not disclose the fastening screw for use in masonry structures.

A somewhat similar screw device is described in UK Patent Specification No 274833 (Rosenberg). The entry end screw thread configuration has a groove which penetrates the normal diameter of the fixing device together with raised border ridges, this configuration extending over a short length only of the shank. Rosenberg does not recommend the fixing device for masonry fixing, referring generally to fibrous and non-flowing materials and in particular to European Patent Specification No 0 225 003 (JSM) and UK Patent Application No 2036227 (Tomoyasu) disclose self-locking screws having a somewhat similar configuration. Helical ridges either side of a small land have their crests grooved. Tomoyasu also refers to a structure in which the ridge crests are not grooved but an intermediate ridge is turned through the land so that there are in fact two parallel grooves forming an overall thread. Both JSM and Tomoyasu relate to self-locking devices reliant on the interaction of male and female threads and there is no disclosure of a use in which the male threaded portion is self-tappingly thread­edly into a masonry bore.

UK Patent Specification No. 2042120 (Gutshall) discloses a headed screw which incorporates a long-pitch helical thread rolled on a cylindrical blank. The rolling leaves untouched a land between adjacent convolutions of the thread. At each juncture between the root of the thread and the adjacent land a helical crest functioning as an auxiliary thread is provided to improve the holding power of the screw. Gutshall refers to use of the disclosed screw in soft, fibrous or low-density materials which are exemplified as wood and plastics. Gutshall does not appear to recommend the disclosed headed screw for fixture self-tappingly in a masonry substrate.

UK Patent Specification No 1541237 (Oratronics) dis­closes a threaded device for use as an endodontic stabilizer. The shank of the disclosed device is turned with a helical groove having a sufficiently wide pitch to provide a parallel inter-turn land. The crest of the ridge is grooved. UK Patent Specification No 1519139 (Crock) discloses a simpler struc­ture for use in surgical techniques. The structure disclosed comprises a threaded shank comprising a thread groove somewhat reminiscent of that shown by Rosenberg as men­tioned above. Crock refers skirtingly and somewhat specu­latively to application in building construction and associ­ated fields but there is no reference specifically to the use of the disclosed device for self-tappingly securing in a masonry bore.

SUMMARY OF THE INVENTION

Accordingly to the invention, there is provided in a preferred embodiment a method of fixing to masonry sub­strates (e.g. brickwork, blockwork or concrete) wherein a bore is formed in said substrate (e.g. in the tension zone or compression zone of a concrete load-supporting member such as a concrete beam) and a fixing device is introduced into said bore self-tappingly or otherwise the fixing device comprising a shank having a bore entry end and an opposed optionally headed end separated from the bore entry end by the length of the shank, at least a portion of the shank length being configured with a thread rolled helical groove depressed into the blank circumference of the shank so as plastically to displace shank material to at least one of the groove sides, the groove being defined adjacent a helical ridge juxtaposed to a side of the groove or, as is preferred, between a pair of parallel helical ridges juxtaposed one either side of the groove and formed in either case of said plastically displaced shank material, said ridges being upstanding from the blank circumference of the shank so as to function in use each as a male thread, at least the leading end of the thread preferably being a female thread-cutting male thread in relation to the masonry, said helical ridges and defined helical groove forming a shank configuration whose convolutions are spaced apart by an intervening land in relation to which the ridges are raised and the groove is depressed, said land having a width measured axially with respect to the shank of at least 50% of the land shank diameter in preferred embodiments of the invention (and preferably also 4 mm as a minimum) and the helix angle of the helical ridge preferably being at least 8° (e.g. at least 10°). Of course, the ridge/groove shank configuration may alternatively be formed by turning from e.g. a solid bar, by casting or by any other method and the invention includes fixing devices so made (turning on a lathe will be appropri­ate in cases of relatively large shank diameters where the large production runs which make the cost of investing in a rolling die viable are not likely to be required, e.g. 16 mm shank sizes and above). The land immediately adjacent the aforesaid shank configurations may be configured (at one or both sides (with a recess running helically of the shank and representing a minor depression relative to the helical groove of the said shank configurations. The male thread may be interrupted by cut-outs at least at the tip in order to confer a thread-cutting facility providing for self-tapping performance. The depressed groove in practice serves to contain substrate debris removed by the self-tapping action. The device used in the invention is unusual in providing a method of fixing in a concrete tension zone; most masonry fixings are designed to operate in the compression zone of concrete members and fail to perform satisfactorily in the tension zone (undercut anchors such as the Upat TOP Anchor being one of a very few exceptions to this).

The fixing device will ordinarily be inserted into a slightly oversized bore (and thus the shank of the device will be slightly undersized in terms of diameter relative to the drill diameter used to produce the bore) in order to avoid an interference fit (which will obstruct threaded insertion).

The shank may be made of a metallic material which is plastically deformable by cold rolling through a die config­ured to form the helical rides and helical groove. The shank may, for example, be made of a ferrous metallic material. Although this material may be iron, it is more typically a ferrous alloy such as carbon steel or possibly stainless steel or similar material which resists corrosion through contact with moisture and chemical materials commonly found in masonry structures (e.g. alkalis). To improve corrosion resistance, the shank may be made of metallic material having a corrosion-resistant finish, for example a coating such as galvanised metallic material.

The ridges conveniently each have a height with reference to the land which is substantially uniform between the axial extremities of the respective ridge.

Alternatively, the ridges may each include a part length which is non-uniform in height with reference to the land and which decreases with progression of the respective ridge helix towards the bore entry end of the shank.

At least the ridges and/or at least the groove may be coated with a friction-reducing material such as a fluoro­carbon polymer although in practice this may be abraded to the point of removal except in soft masonry substrates such as light weight autoclaved aerated cement.

In order to facilitate self-tapping, the helix angle of the helical ridge is preferably at least 10° as noted earlier. Conveniently, the helix angle of the groove will be in the range 15° to 40° with an angle of 30° or 35° being preferred.

A helix angle of 8° to 10° on a relatively large diameter shank (e.g. 22.5 mm) will readily provide a land width equal to the 4 mm preferred minimum referred to earlier and thus when secured in-bore, sections of substrate material of at least 4 mm in axial size between disturbances of the substrate material by the thread of the fixing device. However, with the objective of providing that the axial lengths of such material should be a maximum balanced against the need for adequate radial penetration into the substrate material to provide thread securement, the interspace land will conveniently have a width measured axially with respect to the shank of at least 50% of the field shank diameter.

Preferably, the land width measured axially of the shank will be about 5 mm or more such as in the range 4 mm to 25 mm (e.g. 6 mm to 15 mm) and generally will be 60% to 85% (e.g. 75%) of the land shank diameter.

With the above requirements in mind, the pitch of the groove will generally be between 8 mm and 14 mm with a preferred pitch being about 11 mm. The ridges will conveniently be V-cross-section ridges but may have another configuration (for example, a cross-section generally of V-configuration may have a radius at the apex). In the case of V-cross-section ridges, the sides of the ridges at the apices of the ridges subtend with each other an angle of about 60°.

The shank preferably has a head in the form of a screw-threaded continuation of the shank wherein the thread comprises a helical ridge and a groove extending in parallel so as to present an alternation of ridge turns and groove turns along said continuation. A slot may be provided for drive purposes as may edges defining a hexagon configuration or a depression of hexagonal configuration and, of course, an enlargement may be provided at the head to present any such slot, hexagonal cross-section or hexagonal recess or countersunk or raised countersunk features.

In addition to the method defined, the invention includes within its scope any of the fixing devices as hereinbefore defined in connection with the fixing method of the invention.

BRIEF DESCRIPTION OF THE DRAWINGS

Embodiments of the invention will now be described, by way of example only, reference being made to the accompanying drawings in which.

DETAILED DESCRIPTION OF THE INVENTION

Figure 1:
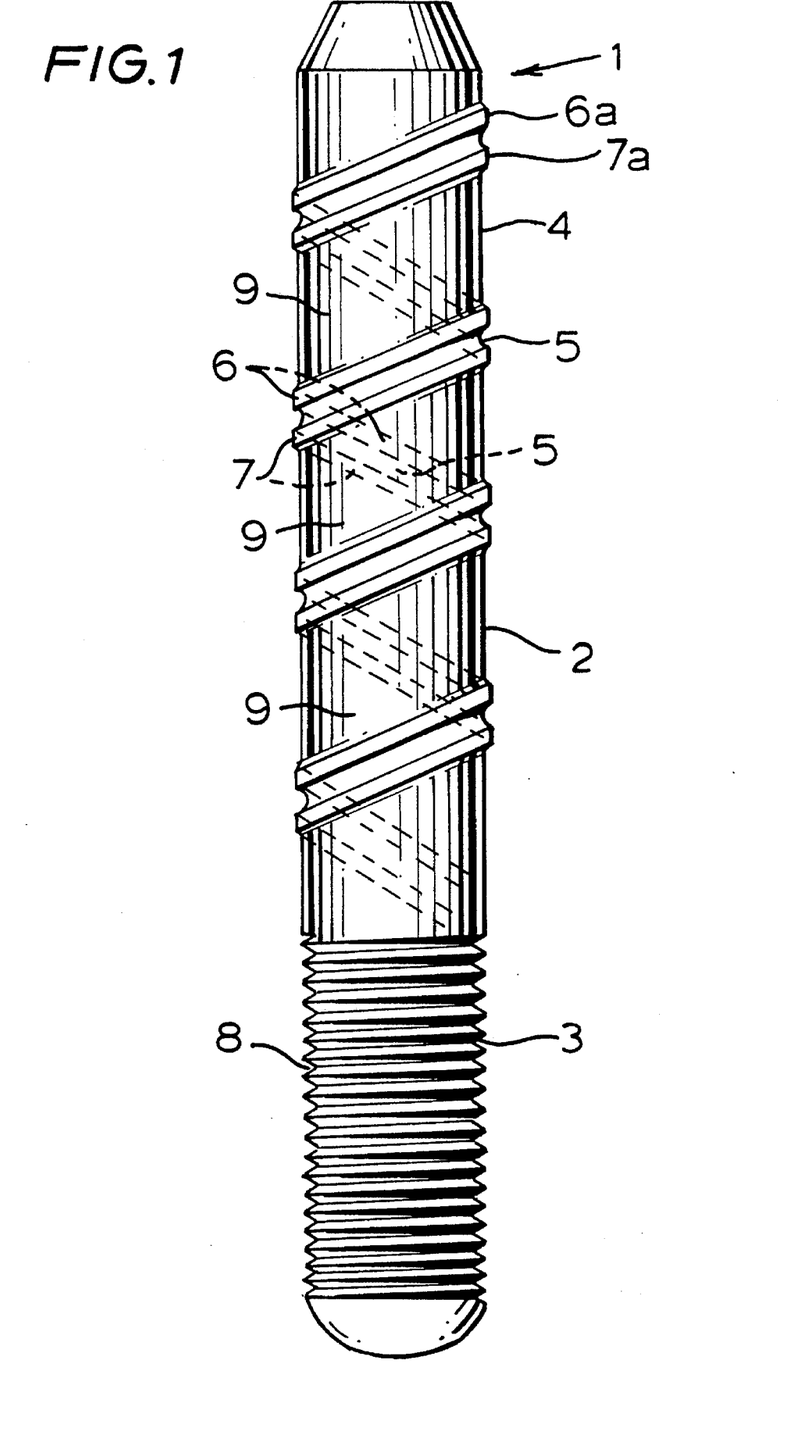
FIG. 1 shows a first embodiment of fixing device according to the invention.
Figure 2:
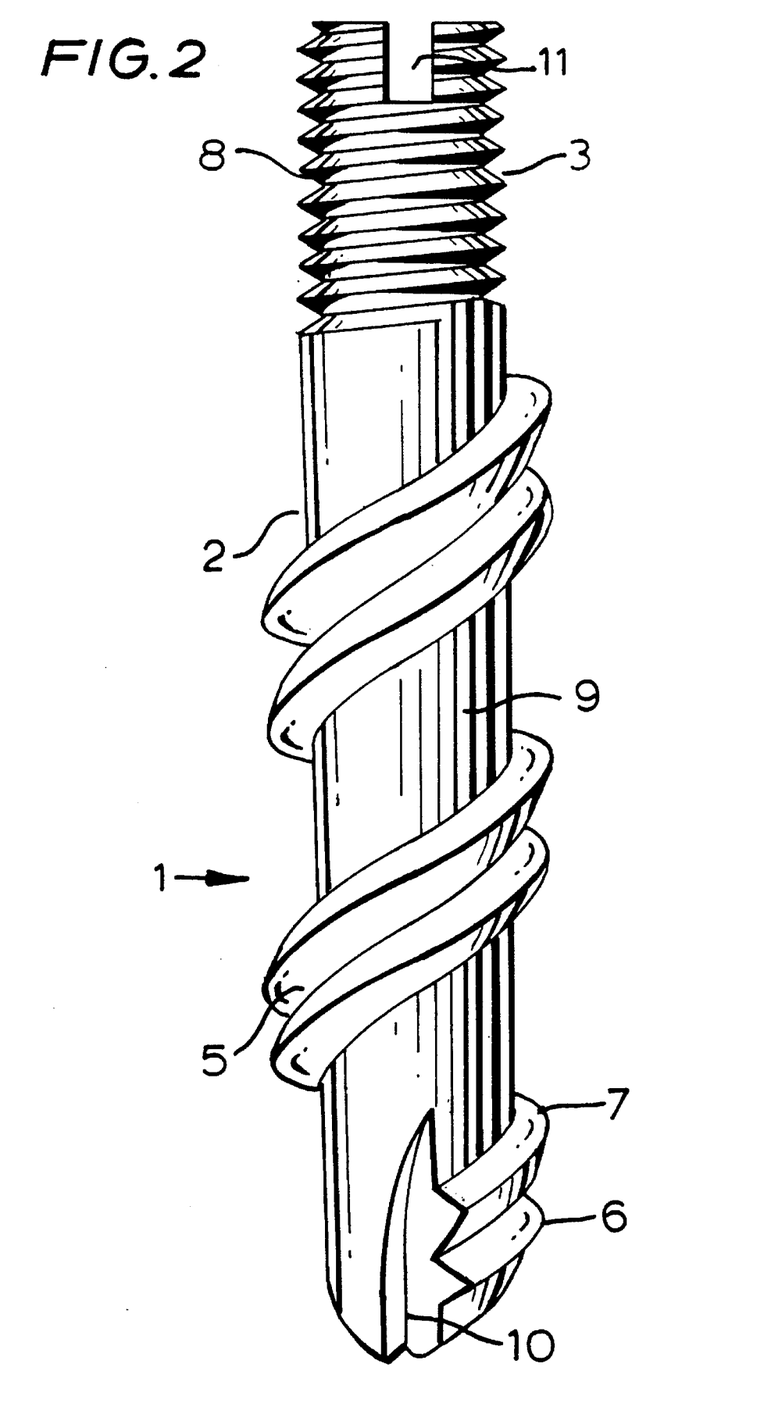
FIG. 2 shows a second alternative embodiment of fixing device according to the invention.
Figure 3A:
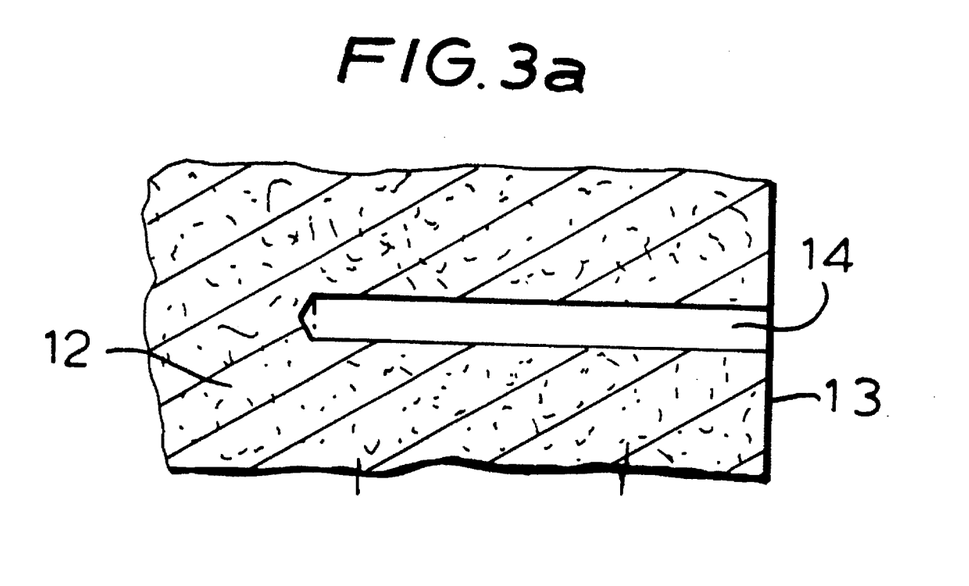
FIGS. 3(a) and 3(b) show two stages in the installation of a third embodiment of fixing device according to the invention similar to that shown in FIG. 2 in a masonry substrate.
Figure 3B:
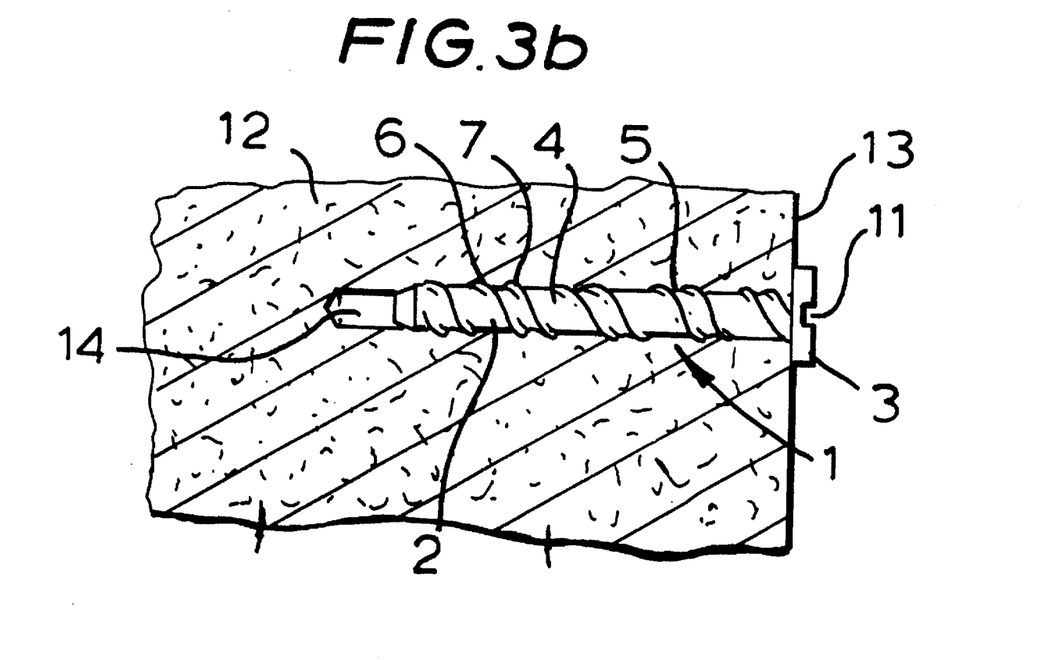
Figure 8:
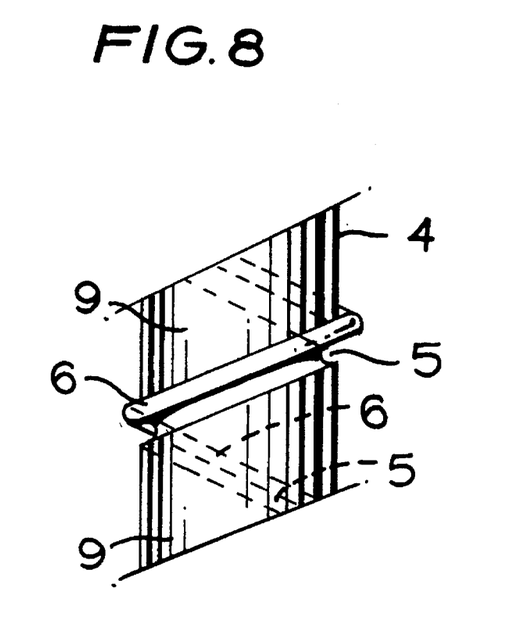
FIG. 8 is a single ridge version of the embodiment shown in FIG. 1, such as may be made using a rolling die as shown in FIG. 7c.

The fixing devices shown in FIGS. 1, 2 and 3 are designated generally by the reference numeral 1 (and the same applies to FIG. 8). In the Figures, like parts are designated by like reference numerals.

The fixing device shown in FIG. 1 comprises (and similar in FIG. 8) a steel shank 2 of solid right circular cylindrical configuration comprising a top section 3 and a bottom or bone-entry section 4. Bottom section 4 has a groove 5 formed in the surface of the blank shank by cold thread rolling. Groove 5 has a helical configuration and extends spirally around the circumference of the bottom section 4 of shank 2 and is co-extensive longitudinally with that section.

Groove 5 is defined between two parallel marginal ridges 6 and 7 (one of which is absent in favour of one ridge and a deeper groove in the case of FIG. 8), formed of shank material displaced from the groove 5 by the plastic deformation which occurs during thread rolling.

Top section 3 of shank 2 is formed with a conventional male screw thread 8 to enable threaded engagement of articles to the fixing element 1 when the fixing element 1 is secured in a masonry structure.

The axial extremities of the shank 2 are formed having regard to the practicalities of the fixing device 1 in use. Thus, for example, the extremity or the bottom portion 4 of shank 2 has a frustoconical configuration to assist bore entry of that extremity. The extremity of the top portion 3 of shank 2 has a domed configuration and is provided with a screwdriver engagement slot, cross-recess, hexagon or square drive (not shown) or screw head enlargement such as one configured with a countersink.

It will be noted that a land 9 is provided between the turns of the ridge-groove-ridge configuration. In the embodiment shown in FIG. 1, the land has a width between turns as measured axially of the shank 2 of 7 mm. The shank land diameter in the example depicted is 10.4 mm and the pitch of the groove 5 is 11 mm, the helix angle of the spiral being 25°. The groove depth relative to the land level is 0.5 mm and the ridge height relative to the land level is 0.5 mm. Of course, fixing devices conforming generally to the embodiment described may be configured with different values for one or more of the above parameters (e.g. land width 10 mm, groove pitch 11 mm, helix angle 30° and ridge height 1.0 mm).

Turns 6(a) and 7(a) of ridges 6 and 7 are configured by means not shown to provide a self-tapping capacity in a masonry structure.

The fixing device embodiment shown in FIG. 2 is broadly similar to that shown in FIG. 1. However, in this embodiment the thread represented by the ridge-groove-ridge turns is much coarser and the in-bore extremity of the shank 2 is slotted by means of slot 10 to provide for self-tapping. The device of FIG. 2 is preferred over that of FIG. 1.

Threaded upper section 3 has a flat top provided with screwdriver engagement slot 11. The remaining features of the fixing device shown in FIG. 2 will be readily understood from the Figure itself, in comparison with FIG. 1, like parts being designated by like reference numerals.

FIG. 3a shows diagrammatically a masonry substrate 12 whose surface 13 is performed by a right circular cylindrical bore 14 drilled into the masonry substrate 12 using a low speed power driven masonry drill bit without hammer action (although, of course, hammer drilling or rotary impact drilling may be adopted as an alternative). In use of fixing devices according to the invention, the first stage in procedures to install the fixing device in a masonry structure is to drill a bore such as that depicted at 14 in FIG. 3(a).

A fixing device according to the invention, such as that shown in FIG. 1 or FIG. 2 of the drawings, is offered up to the bore 14 and its extremity remote from the extremity configured for screwdriver engagement is inserted into the mouth of the bore 14. The fixing element is then rotated manually number of times until the threads 6, 7 start to engage by tapping a corresponding female thread in the outer portions of the wall of the bore 14. This practise is continued until finger turning becomes impractical. A screwdriver is then taken by the operator, engaged with the other extremity of the shank 2 by means of the slot provided for the purpose and further turning effected. The thread represented by ridges 6, 7 continues with this motion to form its own female thread with gradually increasing extent along the length of the internal surface of bore 14 until all of the bottom portion 4 of shank 2 is received in the bore 14. This stage is depicted in FIG. 3(b) where it will be seen that a slightly different embodiment of the fixing device according to the invention is shown in place. The fixing element shown in FIG. 3(b) is one having a coarse thread sharper than that shown in FIG. 1. Self-tapping grooves 10 traverse the ridge-groove-ridge configurations providing a thread-cutting facility along the length of the shank 2 analogously to the slot 10 shown in FIG. 2.

Tabulated in Table 1 below are parameters for three specific examples, respectively, of the fixing devices shown in FIGS. 1, 2 and 3(b) of the drawings:

TABLE 1

| Embodiment | Diameter (mm) | Groove Pitch (mm) | Helix (°) | Land Width (mm) | Groove Depth (mm) | Ridge Height (mm) |
|---|---|---|---|---|---|---|
| FIG. 1 | 10.4 | 11 | 25 | 7 | 0.5 | 0.5 |
| FIG. 2 | 10.4 | 14 | 30 | 10 | 0.5 | 1.5 |
| FIG. 3(b) | 6.36 | 11 | 25 | 6.7 | 0.5 | 1.0 |

In Table 1, land width is measured between adjacent spaced ridges axially of the shank. Groove depth is measured relative to the level of the land and ridge height also is measured relative to the level of the land.

The following specific Example is intended to illustrate use and performance of fixing elements according to the invention relative to various prior art fixing devices:

EXAMPLES

A number of fixing elements were tested in brickwork as set out at A to H in Table 2.

Bores of diameters 8 mm, 10 mm, 12 mm and 14 mm were predrilled in solid brick having a compressive strength of 20.5 N/mm$^2$ (A to E, G and H) or of 15 N/mm$^2$ (F) to various depth as recommended by the manufacturer or 5 mm in excess of fixing device length using, for example, a conventional drill bit of appropriate size driven by a slow speed power drill without hammer action (a hammer action could equally be used).

Fixing elements, shorter than the bore depths, of various types and having diametric sizes of 6 mm, 8 mm, 10 mm and 12 mm were then selected as noted in Table 2 below and matched on the basis bore/element=8/6, 10/8, 12/10 and 14/12 except as stated otherwise.

Matched elements were then introduced, to extents shown in Table 2, into matched bores.

Pull-out strengths (i.e. ultimate tensile strengths) were then determined by applying calibrated loads axially to the fixing elements in the direction of withdrawal. The results are shown in Table 2 and readily demonstrate at least comparable performance as compared to some multi-component devices (Rawlbolt), whilst as compared to bore liners (Fischer Nylon Plug, Upat Ultra Plug) and direct fixtures (Rawl Spike), performance was superior. Expansion bolts, of course, risk of substrate rupture and slower speed of installation.

TABLE 2

| Fixing Device | Hole DA mm | Hole Depth mm | Thread Dia mm | Shank/Length mm | Embedment Depth mm | Ultimate Tensile Strength KN | Substrate Type | Comments |
|---|---|---|---|---|---|---|---|---|
| A Rawlbolt | | | | | | | | |
| M6 | 12 | 50 | M6 | 45 | 45 | 9.2 | 20.5N/mm$^2$ Brick | Multi Component |
| M8 | 14 | 55 | M8 | 50 | 50 | 11.35 | 20.5N/mm$^2$ Brick | Multi Component |
| M10 | 16 | 65 | M10 | 60 | 60 | 14.35 | 20.5N/mm$^2$ Brick | Multi Component |

TABLE 2-continued

| Fixing Device | Hole DA mm | Hole Depth mm | Thread Dia mm | Shank/ Length mm | Embedment Depth mm | Ultimate Tensile Strength KN | Substrate Type | Comments |
|---|---|---|---|---|---|---|---|---|
| M12 | 20 | 85 | M12 | 75 | 75 | 21.5 | 20.5N/mm² Brick | Multi Component |
| B SFS Spike | 4.8 | 40 | 4.8 | 32 | 22 | 2.0 | 20.5N/mm² Solid Brick | None |
| C Rawl Spike | 5.0 | 40 | 5.0 | 40 | 32 | 3.6 | 20.5N/mm² Solid Brick | None |
|  | 6.5 | 40 | 6.5 | 40 | 32 | 4.3 | 20.5N/mm² Solid Brick | None |
| D Fischer Nylon Plug |  |  |  |  |  |  |  |  |
| S6 | 6 | 40 | 5 | 30 | 30 | 2.5 | 20.5N/mm² Solid Brick | Plug & Screw |
| S8 | 8 | 55 | 6 | 40 | 40 | 4.1 | 20.5N/mm² Solid Brick | Plug & Screw |
| S10 | 10 | 70 | 8 | 50 | 50 | 4.4 | 20.5N/mm² Solid Brick | Plug & Screw |
| S12 | 12 | 80 | 10 | 60 | 60 | 4.5 | 20.5N/mm² Solid Brick | Plug & Screw |
| E Fisher Nylon Plug |  |  |  |  |  |  |  |  |
| S6 | 6 | 40 | 5 | 30 | 30 | 2.2 | Perforated Brick | Plug & Screw |
| S8 | 8 | 55 | 6 | 40 | 40 | 3.0 | Perforated Brick | Plug & Screw |
| S10 | 10 | 70 | 8 | 50 | 50 | 4.6 | Perforated Brick | Plug & Screw |
| S12 | 12 | 80 | 10 | 60 | 60 | 4.7 | Perforated Brick | Plug & Screw |
| F UPAT Ultra Plug |  |  |  |  |  |  |  |  |
| U6 | 6 | 40 | 5 | 30 | 30 | 0.5 | 15N/mm² Solid Brick | Plug & Screw |
| U8 | 8 | 55 | 6 | 40 | 40 | 0.8 | 15N/mm² Solid Brick | Plug & Screw |
| U10 | 10 | 65 | 8 | 50 | 50 | 1.1 | 15N/mm² Solid Brick | Plug & Screw |
| U12 | 12 | 75 | 10 | 60 | 60 | 1.5 | 15N/mm² Solid Brick | Plug & Screw |
| G FIG. 2 | 6 | 45 | 6.36 | 40 | 30 | 7.0 | 20.5N/mm² Solid Brick | None |
| H FIG. 2 | 10 | 55 | 10.4 | 50 | 40 | 12.5 | 20.5N/mm² Solid Brick | None |

Figure 4:
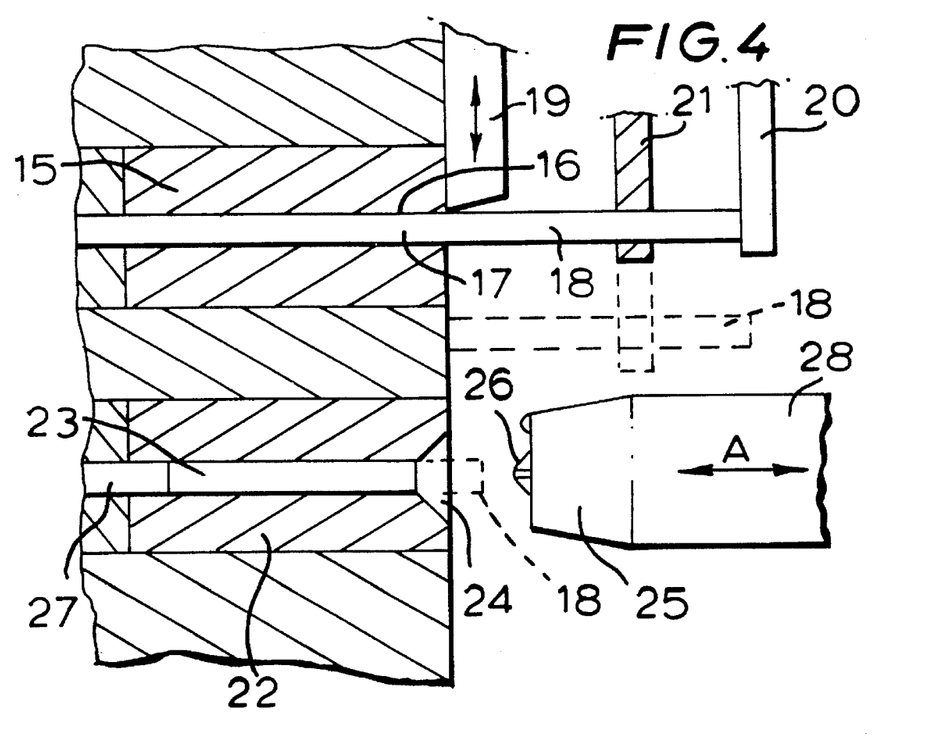
FIG. 4 shows schematically a screw heading station forming part of a screw production line.

Referring to FIG. 4, a screw heading station comprises a solid metallic block 15 formed with a right circular cylindrical uniform diameter bore 16. Steel wire 17 passes along bore 16 and is urged until its end abuts against stop 20. A cut-off knife 19 is mounted for reciprocatory motion radially across the mouth of bore 16 so a to server the wire 17 to form a blank 18. A transfer finger mounted for reciprocatory motion parallel to that of cut-off knife 19 is provided for transferring cut off blank 18 a stage further in the heading operation as depicted at two points in FIG. 4 in broken lines. At the maximum displacement of transfer finger 21, blank 18 is disposed in register with a bore 23 in solid metallic block 22, bore 23 being identical with bore 16 in block 15 except that bore 23 has a blind end represented by the crown of a piston 27 moveable axially of bore 23 to provide for different desired lengths of fixing element. Whilst retained by transfer finger 21, blank 18 is displaced into bore 23 in block 22 by means of a first of two punches 25 mounted for reciprocatory motion in the directions of double headed arrow A shown in FIG. 4.

Figure 5:
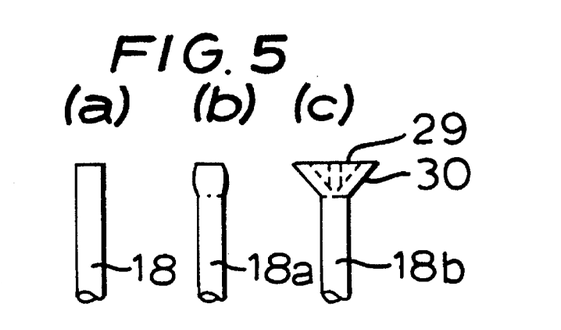
FIGS. 5(a), 5(b) and 5(c) show various stages in the plastic deformation of a cut off blank wire section in a screw heading process using the apparatus shown in FIG. 4.

The mouth 24 of bore 23 is depressed into the body of block 22 and have the configuration of a countersink. The first of punches 25 drives blank 18 fully into bore 23 and produces the partial plastic deformation shown in FIG. 5(b). The first punch 25 is provided with a plane punch face 28. The second punch 25 is provided with a punch face 28 having a structure 26 disposed thereon for forming in the head of the fixing device a screw engagement depression 29 having a so-called Posidrive configuration. The action of the second of the two punches 25 complete plastic deformation of the terminal end of blank 18 to form the head 30 shown in FIG. 5(c).

Figure 6:
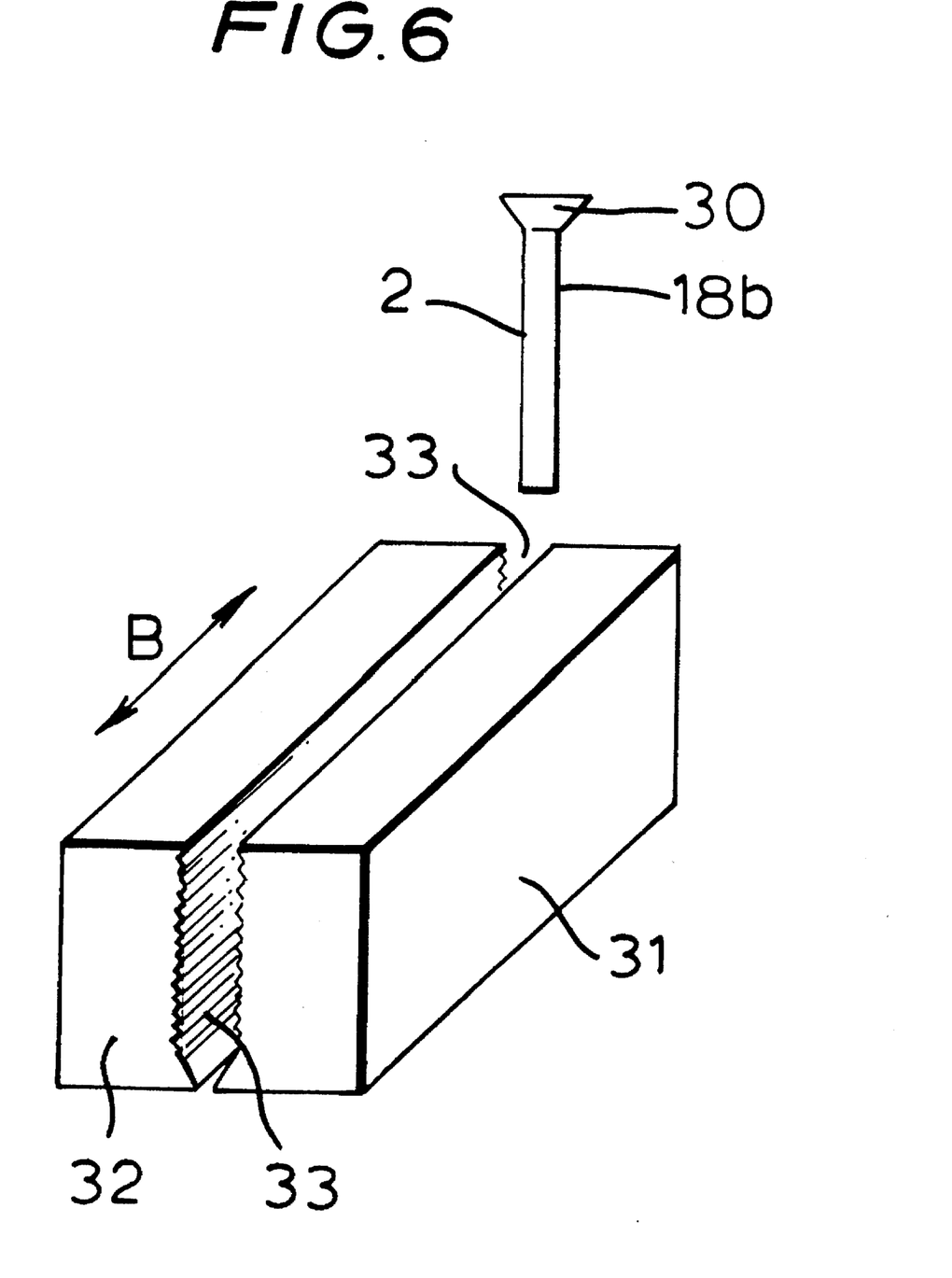
FIG. 6 shows schematically a thread rolling station forming part of a screw production line for use in forming a ridge-groove-ridge configuration according to the invention.
Figure 7A:
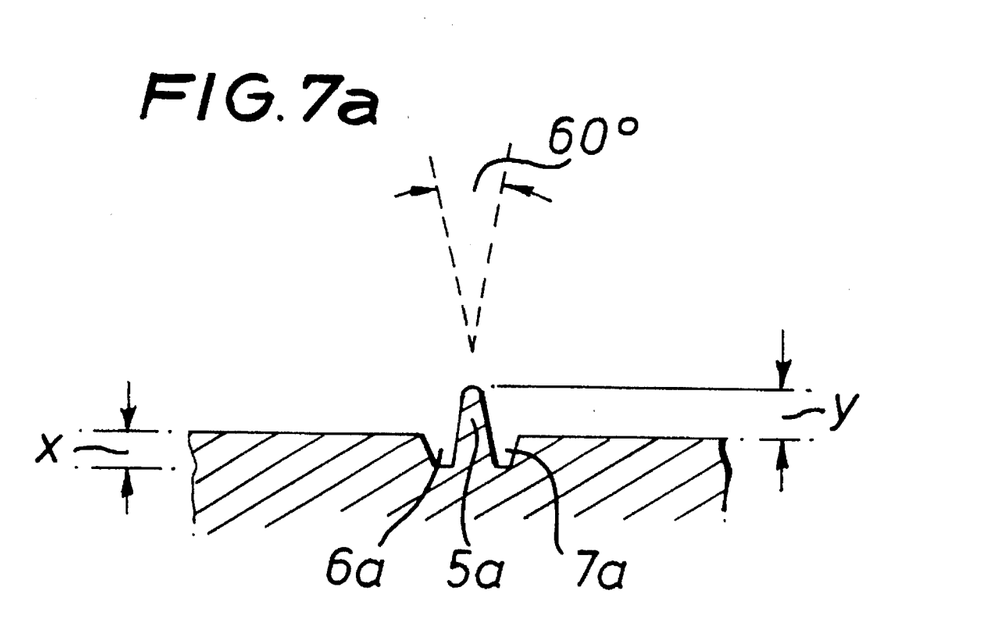
FIG. 7a shows in cross-section the die construction relative to FIG. 6 in greater detail but diagrammatically.
Figure 7B:
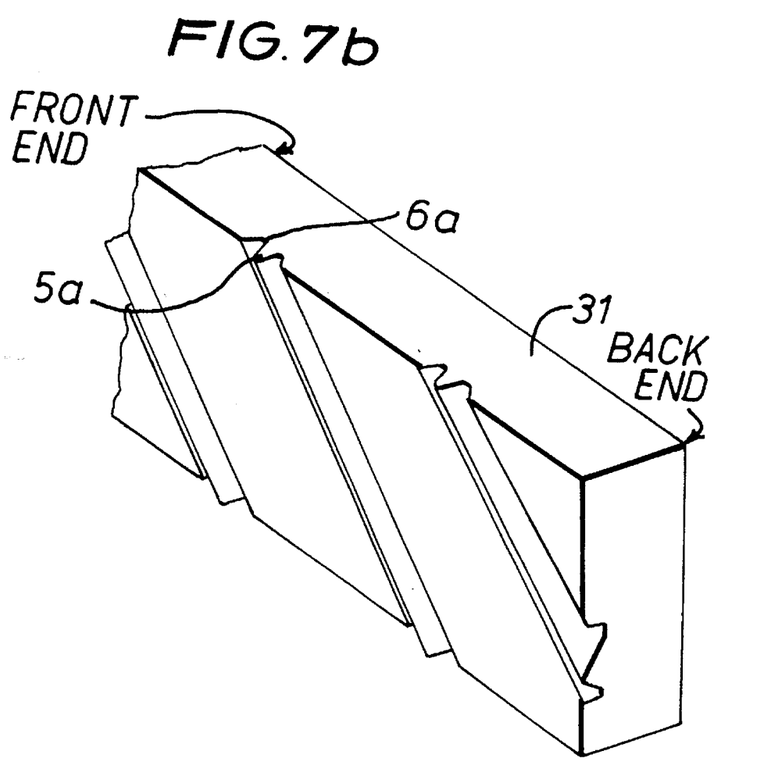
FIG. 7b shows the die construction of FIG. 7a as a perspective view.
Figure 7C:
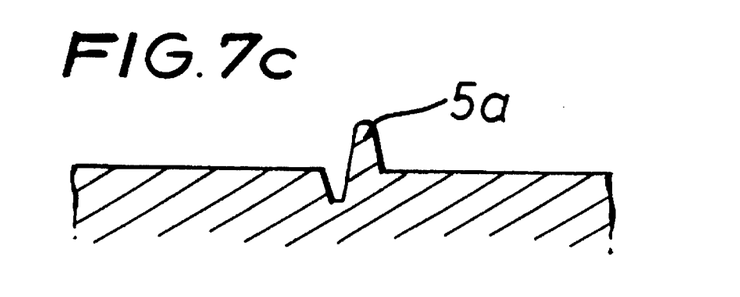
FIG. 7c is similar to FIG. 7a but shows an alternative die construction which is configured to make a fixing device comprising a single helical groove.

The thread rolling station shown in FIGS. 6 and 7 comprises a fixed die 31 and a displaceable die 32. The two dies are spaced apart to form jaw 33, the gap there between being equal to the core diameter of the product being rolled. Die 32 is displaceable in reciprocatory fashion according to the arrow B shown in FIG. 6. In use, headed blank 18b is inserted into jaw 33 and thus between the fixed and moving dies 31, 32 by manual or mechanical means (e.g. a mechanical feed finger) as is known in the thread rolling art. The vertical position of the blank in relation to the fixed and moving die is governed by a work rest on which the blank 18b rests prior to introduction to the dies by the feed finger. The operational sequence is for the moving die 32 to move clear of being parallel with the fixed die 31 in the direction of arrow B. Blank 18b is then transferred by the feed finger into the work rest and pushed against and between the leading edge of moving die 32 and the back edge of fixed die 31. The reciprocating action of the moving die 32 then carries the blank 18b between them, during which time the blank 18b is plastically deformed to the face of the dies, as the blank rolls along the faces thereof, to form ridge-groove-ridge convolutions are depicted in FIG. 1, 2 and 3(b); a die groove corresponding to a ridge on the fixing element is shown at 6a and another at 7a (FIG. 7a) whilst ridge 5a corresponds to groove 5 of the fixing element.

Figure 9:
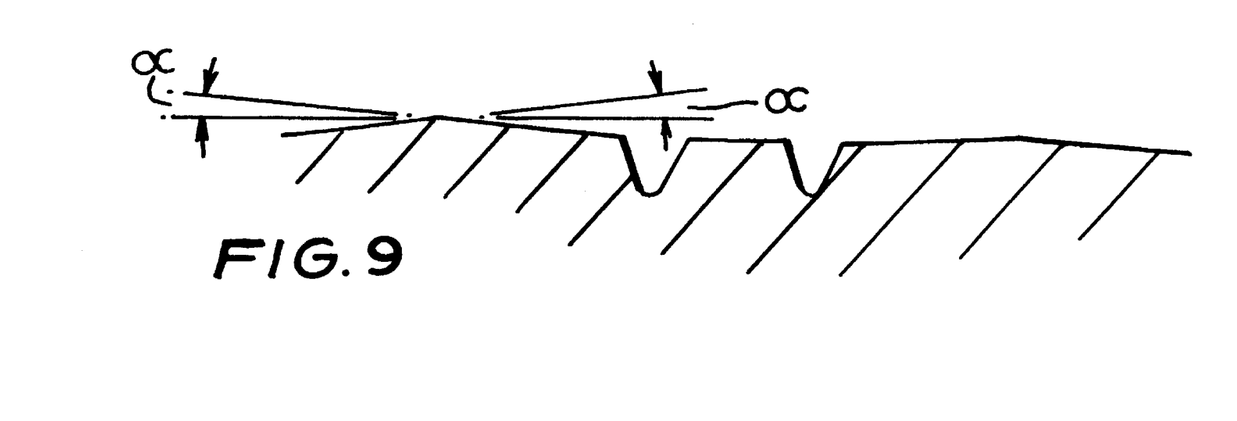
FIG. 9 is a diagrammatic representation of a second alternative die construction for use the thread rolling station of FIG. 6.
Figure 10:
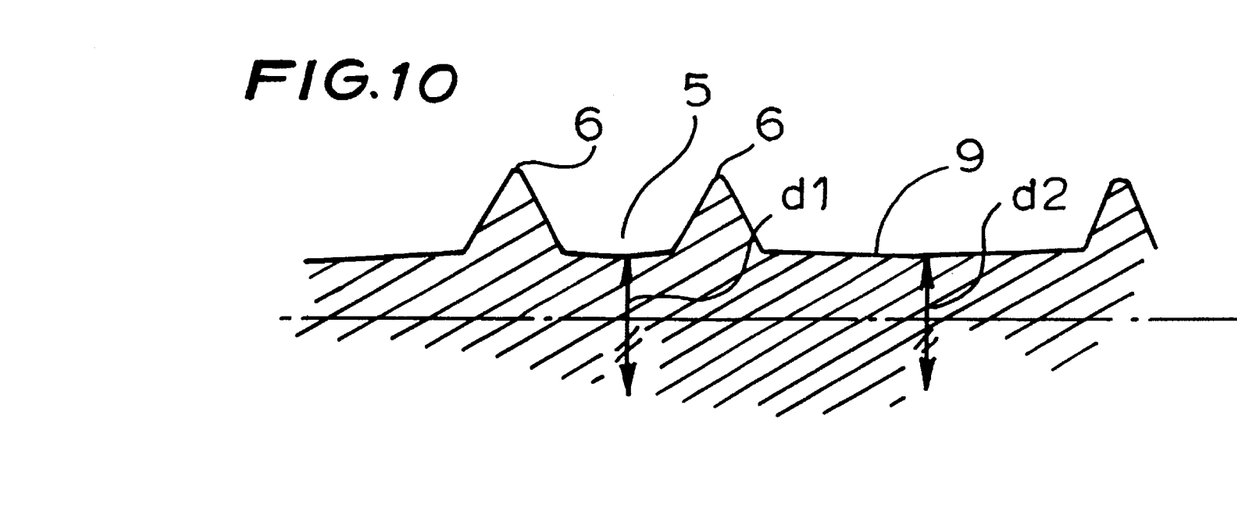
FIG. 10 is a diagrammatic representation of a fixing device made using a thread rolling station equipped with a die as shown in FIG. 9, the device being shown in cross-section and in terms of one diametric half only of the shank of the device.

Fixing device production using the die of FIG. 9 is broadly the same as described above for the other die configurations given herein. The angle α will be varied to suit the blank diameter used and the material being rolled, stainless steel and boron steel, to give but two examples, giving rise to different requirements in order to achieve controlled plastic flow of shank material from the body of the device to form the helical thread ridges 6. By using this die structure, a fixing device can be rolled which maintains a core diameter d1 similar to d2 (or the same). However, the land in fact has a helical depression as a result of the rolling action exercised to displace shank material and control its flow through the choice of die configuration. The groove 5 is similarly depressed to a helical centre line between the thread ridges which enclose the groove.

As compared to two-part fixing systems, fixing elements according to the invention provide efficiency of installation and greater security of fixture in terms of pull-out strength. As shown in Table 2 hereinbefore, pull-out strength performance at least in brick is superior to most expansion bolts and plastics fixings in brickwork. The fixing devices according to the invention produce secure fixture in bores in masonry substrates ranging from brick, light-weight aerated autoclaved cement blockwork and various forms of concrete without the problems associated with expansion bolts due to the risk of rupture of the substrate material. Fixing elements according to the invention can also easily be manufactured by the steps of cold forging and thread rolling, bright zinc plating and heat treatment without resort to complex assembly operations such as are normally associated with an expansion bolt. This produces economics in terms of materials and manufacturing costs as well as the economics associated with relative ease of installation.

I claim:

1. A fixing device for use in fixing to masonry or timber substrates, the device comprising a shank having a bore entry end and an opposed end which is provided with a head and is separated from the bore entry end by the length of the shank, at least a portion of the shank length being configured with a thread rolled helical groove depressed into the blank circumference of the shank so as plastically to displace shank material to at least one of the groove sides, the groove being defined adjacent a helical ridge juxtaposed to a side of the groove and formed of said plastically displaced shank material, said ridge being upstanding from the blank circumference to the shank so as to function in use as a male thread, at least the leading end of the thread being a female thread-cutting male thread in relation to the material of the substrate, and helical ridge and defined helical groove forming a shank configuration whose convolutions are spaced apart by an intervening land in relation to which the ridge is raised and the groove is depressed, and wherein said land has a width measured axially with respect to the shank of at least 4 mm and at least 50% of the land shank diameter, and the helix angle of the helical ridge being at least 10°.

2. A fixing device for use in fixing to masonry or timer substrate, the device comprising a shank having a bore entry end and an opposed end which is separated from the bore entry end by the length of the shank, at least a portion of the shank length being configured with a thread rolled helical groove depressed into the blank circumference of the shank so as plastically to displace shank material to at least one of the groove sides, the groove being defined adjacent a helical ridge juxtaposed to a side of the groove and formed of said plastically displaced shank material, said ridge being upstanding from the blank circumference of the shank so as to function in use as male thread, said helical ridge and defined helical groove forming a shank configuration whose convolutions are spaced apart by an intervening land in relation to which the ridge is of substantially raised level and the groove is depressed or of the same level or substantially the same level, and wherein said land has a width measured axially with respect to the shank of at least 4 mm and at least 50% of the land shank diameter, and the helix angle of the helical ridge being at least 10°.

3. A fixing device for fixing to a masonry substrate comprising a shank fabricated from heat treated metal and having a bore entry end and an opposed end separated from the bore entry end by the length of the shank, the shank having a tapered portion adjacent the bore entry and, at least a portion of the shank length being configured with a helical land separating the turns of a helical thread configuration, the thread configuration having a leading end portion comprising a female thread-cutting male thread, in relation to the masonry substrate the turns of the land having a width measured axially with respect to the shank of at least 50% of the land shank diameter, the turns of the land intermediate the tapered portion and the opposed end being defined by a cylindrical surface of the shank, and the helix angle of the helical being at least 10°.

4. A fixing device comprising a shank having a bore entry end and an opposed end separated from the bore entry end by the length of the shank, at least a portion of the shank length being configured with a helical land separating the turns of a helical thread configuration, the turns of the land having the width measured axially with respect to the shank of at least 4 mm and at least 50% of the land shank diameter, and the helix angle of the helical ridge being at least 10%; and wherein the shank is formed with a configuration comprising a single helical thread and a single adjacent helical parallel groove depressed with respect to the helical land.

5. A fixing device as claimed in claim 4 wherein the position of the groove relative to the adjacent thread is spaced therefrom in a forward axial direction towards the bore entry end.

6. A fixing device comprising a solid shank having a tapered bore entry end and an opposed end which is provided with a head and is separated from the bore entry end by the length of the shank, at least a portion of the shank length being configured with a helical land separating the turns of a helical thread configuration, the turns of the land having a width measured axially with respect to the shank of at least 4 mm and at least 50% of the land shank diameter, and the helix angle of the helical ridge being at least 10%; and wherein the shank is formed with a configuration comprising a pair of spaced apart parallel threads and a juxtaposed parallel groove disposed therebetween, said configuration having helical turns spaced apart by said helical land.

7. A fixing device as claimed in claim 6 wherein the groove floor comprises a pair of mutually inclined helical surfaces intersecting at a helical center line intermediate the spaced apart parallel threads to thereby define a depression in the groove floor.

8. A fixing device as claimed in claim 7 wherein the land comprises a further pair of mutually inclined helically surfaces intersecting at a further center line intermediate adjacent turns of the helical thread configuration to thereby define a depression in the land.

9. A fixing device for use in fixing to masonry or timber substrates, the device comprising a shank having a bore entry end and an opposed end which is provided with a head and is separated from the bore entry end by the length of the shank, at least a portion of the shank length being configured with a thread rolled helical groove depressed into the blank circumference of the shank so as plastically to displace shank material to at least one of the groove sides, the groove being defined between a pair of adjacent helical ridges, one either side of the helical groove and formed of said plastically displaced shank material, said ridges being upstanding from the blank circumference of the shank so as to function in use as a male thread, at least the leading end of the thread being a femal thread cutting male thread in relation to the material of the substrate, said helical ridges and defined helical groove forming a shank configuration whose convolutions are spaced apart by an intervening land in relation to which the ridges are raised and the groove is depressed, and wherein said land has a width measured axially with respect to the shank of at least 4 mm and at least 50% of the land shank diameter, and the helix angle of the helical ridges being at least 10°.

10. A fixed device for use in fixing to masonry or timber substrates, the device comprising a shank have a bore entry end and an opposed end which is separated from the bore entry end by the length of the shank, at least a portion of the shank length being configured with a thread rolled helical groove depressed into the blank circumference of the shank so as plastically to displace shank material to at least one of the groove sides, the groove being defined between a pair of adjacent ridges one either side of the groove and formed of said plastically displaced shank material, said ridges being upstanding from the blank circumference of the shank so as to function in use as male thread, said helical ridges and defined helical groove forming a shank configuration whose convolutions are spaced apart by an intervening land in relation to which the ridges are of raised level and the groove is of substantially the same level, and wherein said land has a width measured axially with respect to the shank of at least 4 mm and at least 50% of the land shank diameter, and the helix angle of the helical ridges being at least 10°.

11. A fixing device comprising a shank having a bore entry end and an opposed end separated from the bore entry end by the length of the shank, at least a portion of the shank length being configured with a helical land separating the turns of a helical thread configuration, the turns of the land having a width measured axially with respect to the shank of at least 4 mm and at least 50% of the land shank diameter, and the helix angle of the helical ridge being at least 10°; wherein the shank is formed with a configuration comprising a pair of spaced apart parallel threads and a juxtaposed parallel groove disposed therebetween, said configuration having helical turns spaced apart by the helical land and wherein the groove is depressed relative to the helical land.

12. A fixing device comprising a shank having a bore entry end and an opposed end separated from the bore entry end by the length of the shank, at least a portion of the shank length being configured with a helical land separating the turns of a helical thread configuration, the turns of the land having a width measured axially with respect to the shank of at least 4 mm and at least 50% of the land shank diameter, and the helix angle of the helical ridge being at least 10°; wherein the shank is formed with a configuration comprising a pair of spaced apart parallel threads and a juxtaposed parallel groove disposed therebetween, said configuration having helical turns spaced apart by the helical land and wherein the groove floor is generally relatively at substantially the same level as the general level of the helical land.

* * * * *

UNITED STATES PATENT AND TRADEMARK OFFICE
CERTIFICATE OF CORRECTION

PATENT NO. : 5,531,553
DATED : July 2, 1996
INVENTOR(S) : Charles Bickford

Page 1 of 3

It is certified that error appears in the above-indentified patent and that said Letters Patent is hereby corrected as shown below:

In the Abstract: Item [57],

Line 14, replace "configuration" with --configurations--.

Column 2, line 49, replace "or" with --of--.

Column 2, line 63, replace "slop" with --slot--.

Column 3, line 48, replace "Accordingly" with --According--.

Column 6, line 21, replace "similar" with --similarly--.

Column 7, line 9, replace "performed" with --perforated--.

Column 9, line 50, replace "have" with --has--.

Column 9, line 58, replace "complete" with --completes--.

Column 11, line 1, replace "produce" with --provide--.

UNITED STATES PATENT AND TRADEMARK OFFICE
CERTIFICATE OF CORRECTION

PATENT NO. : 5,531,553

DATED : July 2, 1996

INVENTOR(S) : Charles Bickford

It is certified that error appears in the above-indentified patent and that said Letters Patent is hereby corrected as shown below:

Column 11, Claim 1, line 25, replace "to," first occurrence, with --of--.

Column 11, Claim 1, line 28, replace "and," first occurrence, with --said--.

Column 11, Claim 2, line 35, replace "timer" with --timber--.

Column 11, Claim 3, line 59, replace "and" with --end--.

Column 11, Claim 3, line 64, replace "substrate" with --substrate,--.

Column 12, Claim 8, line 39, replace "helically" with --helical--.

Column 12, Claim 9, line 56, replace "femal thread cutting" with --female thread-cutting--.

UNITED STATES PATENT AND TRADEMARK OFFICE
CERTIFICATE OF CORRECTION

PATENT NO. : 5,531,553
DATED : July 2, 1996
INVENTOR(S) : Charles Bickford

It is certified that error appears in the above-indentified patent and that said Letters Patent is hereby corrected as shown below:

Column 12, Claim 10, line 65, replace "fixed" with --fixing--.

Column 12, Claim 10, line 66, replace "have" with --having--.

Signed and Sealed this

Third Day of December, 1996

Attest:

Attesting Officer

BRUCE LEHMAN

Commissioner of Patents and Trademarks